United States Patent [19]

Chavet

[11] Patent Number: 5,273,094
[45] Date of Patent: Dec. 28, 1993

[54] PNEUMATIC VEHICLE TIRE INCLUDING OVERLAPPING CARCASS LAYER SECTIONS

[75] Inventor: Rudolf Chavet, Raeren, Belgium

[73] Assignee: Uniroyal Englebert Reifen GmbH, Aachen, Fed. Rep. of Germany

[21] Appl. No.: 726,386

[22] Filed: Jul. 5, 1991

[30] Foreign Application Priority Data

Jul. 5, 1990 [DE] Fed. Rep. of Germany ........ 4021450

[51] Int. Cl.$^5$ .............................. B60C 9/02; B60C 9/17
[52] U.S. Cl. .................................. 152/455; 152/548; 152/550; 152/551; 152/561
[58] Field of Search ....................... 152/548, 550, 558-

[56] References Cited

U.S. PATENT DOCUMENTS

| | | | |
|---|---|---|---|
| 3,074,456 | 1/1963 | Neuville et al. | 152/559 X |
| 3,451,461 | 6/1969 | Wittneben | 152/551 X |
| 3,496,984 | 2/1970 | Boileau | 152/562 X |
| 3,554,261 | 1/1971 | Mirtain et al. | 152/455 |
| 3,690,363 | 9/1972 | Guyot | 152/560 X |
| 4,185,675 | 1/1980 | Greiner et al. | 152/561 X |
| 4,469,157 | 9/1984 | Morikawa et al. | 152/561 X |
| 4,832,103 | 5/1989 | Slivka et al. | 152/561 X |

FOREIGN PATENT DOCUMENTS

| | | |
|---|---|---|
| 1480921 | 9/1963 | Fed. Rep. of Germany . |
| 1480922 | 9/1963 | Fed. Rep. of Germany . |
| 1480949 | 4/1965 | Fed. Rep. of Germany . |
| 1480958 | 10/1965 | Fed. Rep. of Germany . |
| 1680433 | 7/1967 | Fed. Rep. of Germany . |
| 2416445 | 10/1974 | Fed. Rep. of Germany ...... 152/550 |
| 2224314 | 10/1974 | France . |

Primary Examiner—Michael W. Ball
Assistant Examiner—Adrienne C. Johnstone
Attorney, Agent, or Firm—Robert W. Becker & Associates

[57] ABSTRACT

In a pneumatic vehicle tire of a divided carcass the reinforcement elements are arranged at different angles of orientation. They may be provided as a combination of the same or different materials, the same or different cord constructions, the same or different packing densities. The overlap area of two adjacent carcass layer sections represents a transition area of a gradually stepped stiffness. The overlap area represents a constructive discontinuity and is employed for influencing the force fluctuations. The divided carcass which is essentially a sounding board may also be influenced by differently constructed carcass layer sections. The manufacture of such a divided carcass is inexpensive.

16 Claims, 3 Drawing Sheets

PNEUMATIC VEHICLE TIRE INCLUDING OVERLAPPING CARCASS LAYER SECTIONS

The present invention relates to a pneumatic vehicle tire which comprises essentially a radial carcass with tire beads, sidewalls and a tire tread. The carcass comprises carcass layer sections. Two of the carcass layer sections with respective looped-around ends are anchored at respective bead cores and respective further ends of the layer sections are disposed within respective overlap areas with adjacent layer sections. The two layer sections may overlap with one another or with further layer sections. The reinforcement elements, i.e., the reinforcement carrier elements of the carcass, are essentially radially extending. The tire tread is reinforced by a belt-type layer between the carcass and the tire tread.

Pneumatic vehicles tire the carcass of which comprises carcass layer sections have been known from DE-OS 14 80 922, 14 80 921, 14 80 958, 14 80 949 and 16 80 433. The reinforcement elements are at least partially arranged in a radial orientation within the bead section and the side walls, or they are disposed at a small angle relative to the radial orientation. These reinforcement elements or further reinforcement elements of further carcass layer sections which are independent from the first mentioned reinforcement elements are arranged in the center section, that is below the tire tread, at an angle of 17° to 45° and form a belt-like reinforcement for the tire tread. In a double-layered arrangement these reinforcement elements are disposed such that the layers cross one another. The overlap areas of the carcass layer sections form desired additional reinforcement areas. These pneumatic vehicle tires with divided carcasses must be improved with respect to the overlap areas.

It is therefore an object of the present invention to improve the properties of pneumatic vehicle tires with respect to stability, stiffness and strength, steering characteristics in general, directional stability as well as with respect to constructive uniformness and noise emission, whereby the aforementioned properties should be achieved with an inexpensive carcass construction.

It is a further object of the present invention, on the one hand, to influence the tension gradient of the carcass and therefore of the pneumatic vehicle tire by employing a special construction and arrangement of the carcass layer sections at certain selectable positions in order to improve the aforementioned tire characteristics and, on the other hand, to positively influence the uniformness of the vehicle tire by consciously integrating the overlapping area as a discontinuity factor thus improving the noise emission by influencing the harmonic oscillations of the carcass which acts as a sounding board.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
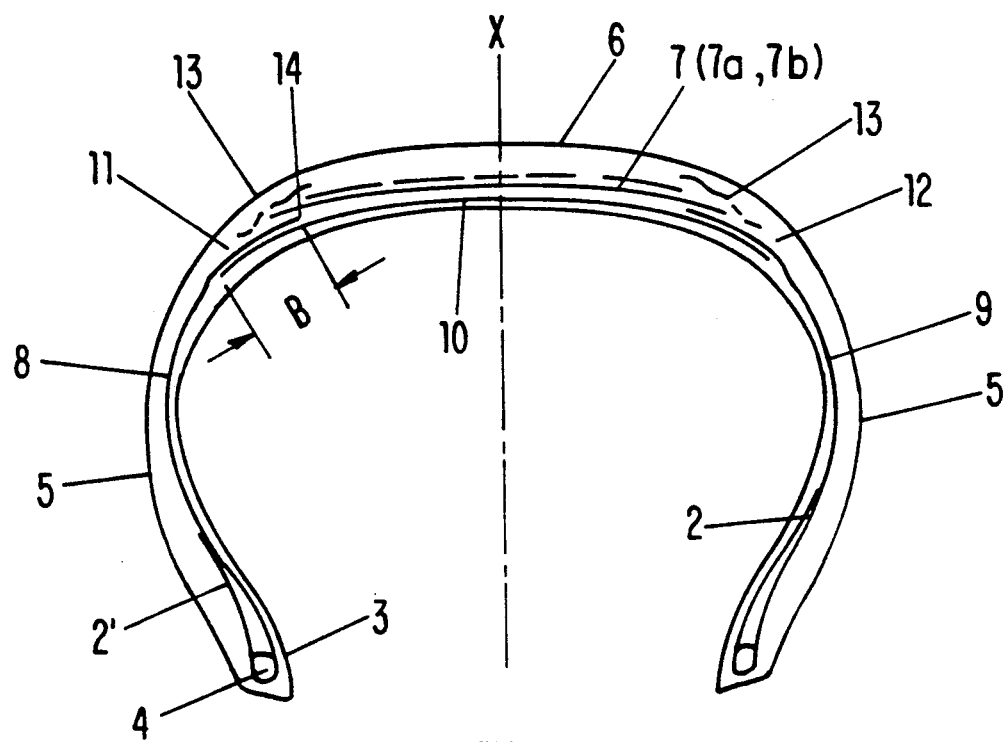
FIG. 1 shows a pneumatic vehicle tire in a cross-sectional view having a carcass made from individual carcass layer sections.

The pneumatic vehicle tire of the present invention is primarily characterized by reinforcement elements of at least one of the carcass layer sections having a different orientation than further reinforcement carrier elements of further carcass layer sections, whereby at least one orientation is radially disposed, at an angle of 90° relative to the equatorial plane of the vehicle tire and at least one further orientation is disposed at an angle of between 85° and 88° relative to said equatorial plane at least one of the overlap areas between a respective center of the sidewalls and a respective shoulder portion of the tire tread has a stepped stiffness transition area.

Furthermore, with the carcass layer sections and especially their reinforcement elements, combinations of the same or different materials, the same or different cord constructions, the same or different cord packing densities, and the same or different angles of orientation relative to the radial orientation of the carcass layer sections, especially of their reinforcement elements, may be employed. It is thus possible to make the carcass layer sections from the same material or from different materials. Also, the reinforcement carrier elements of one carcass layer section may be made from the same or different material from the reinforcement elements of another carcass layer section. The reinforcement elements of one of the carcass layer sections may have the same or different cord construction from the cord construction of the reinforcement elements of another carcass layer section and may have the same or different packing density from the packing density of the reinforcement elements of another carcass layer section. The angle relative to the radial orientation may be identical for the carcass layer sections or may be different.

Due to the aforementioned embodiments and arrangements of the carcass layer sections the tension gradient over the length of the carcass cross-section from the radial orientation to a diagonal orientation at an angle relative to the radial orientation or vice versa may be influenced in a gradually stepped manner, whereby the one and/or the other overlap area may act in a symmetric or asymmetric manner. The overlap areas acts as an area of higher stiffness, but via material, angle of orientation, cord construction and cord arrangement this area may be adjusted in a gradually stepped manner. Force fluctuations as well as harmonic oscillations may be adjusted as desired in this manner.

The following materials may be used for the reinforcement elements which form the carcass layer sections: rayon, polyamide, polyester and aromatic polyamide in certain selectable cord constructions or fiber constructions or steel fabric, respectively steel cord. The stiffness depends on the cord construction and the layer sections may be influenced by the number of cords within the packing density. The sheathing material for the reinforcement elements may be selected from the group comprising reliable and proven elastomers such as natural rubber, styrene-butadiene-copolymers, polybutadiene and other materials or mixtures of the aforementioned elastomers.

The overlap area represents a stepped stiffness section within the area between the sidewalls and the tire shoulder and may be formed from a single layer or multiple layer carcass layer section. These overlap areas represent discontinuity factors which influence the measurable force fluctuations of the finished pneumatic vehicle tire. Due to a certain, but selectable arrangement and number of carcass layer sections that are extending from the tire bead to the tire shoulder area and may be present in the center section of the vehicle tire as well, the stiffness and stability must be selected to conform to the desired tire properties and especially to the desired tire uniformness. Optionally, depending on the material used for the carcass layer sections, single layers or double layers or even multiple layers may be employed.

The ends of the carcass layer sections overlap one another and may also be overlapped by the belt edges. Due to the chosen materials for the carcass layer sections and the arrangements and the dimensions within the overlap areas, the force fluctuations of the finished pneumatic vehicle tires may be influenced in a desired manner. The oscillation behavior of the carcass which represents a sounding board may be more or less adjusted to a desired frequency band so that a high uniformness of the tire body and a low noise emission is achieved. Besides these aforementioned properties the spring action and the cushioning as well as the deformation of the pneumatic vehicle tire body may be influenced as desired. The improved stability within the different tire sections formed by differently constructed overlap areas results in a reduced material fatigue.

In a further embodiment the carcass comprises a plurality of carcass layer sections arranged in a symmetric or asymmetric manner. The reinforcement elements, at the overlap areas, of the carcass layer sections, are arranged radially or crossed relative to one another and represent a further stepped reinforcement. With respect to the harmonization of the uniformness they must be stepped in a gradual manner. A carcass which is asymmetrically built by having only one or at least one overlapping area with at least two carcass layer sections may be made from a shorter and a longer, for example, single layer carcass layer section. The desired higher tire stiffness may be provided by overlapping a sufficient length and width of the carcass layer sections thus forming a sufficient double layer within the overlapping area. An asymmetrically constructed carcass is advantageously combined with a tire tread having an asymmetric tread. The higher stress load of such pneumatic vehicle tires, especially within the asymmetrically embodied area, is advantageously compensated for by the overlapping area of the carcass layer sections.

In general, the use of different materials is advantageous in reducing the manufacturing costs of the carcass. It is possible, for example, to use a combination of inexpensive carcass layer sections in a double layer and/or expensive carcass layer sections of a high stiffness.

In a preferred embodiment the carcass comprises a first and a second carcass layer sections with looped-around ends, whereby the first and second layer sections extend from the bead cores to the shoulder portions, and a third layer section bridges a center portion of the vehicle tire. It is preferable, that the first and second layer sections are provided with respective auxiliary layer sections that are disposed axially outwardly from the respective first and second layer sections and extend from the bead cores to the shoulder portions.

Furthermore, it is advantageous that the third layer section which bridges the center portion comprises layers differently formed from the layers of the first and the second carcass layer sections. The layers of the third layer section have different widths.

In another embodiment the carcass comprises at least two of the layer sections with at least one overlap area whereby it is preferred that the layer sections are arranged in an asymmetric manner.

DESCRIPTION OF PREFERRED EMBODIMENTS

The present invention will now be described in detail with the aid of several specific embodiments utilizing FIGS. 1-5.

The pneumatic vehicle tire 1 according to FIG. 1 comprises essentially a divided carcass 2 with tire beads 3, that have pull-resistant bead cores 4. The looped-around ends 2' of the carcass 2 are anchored at the bead cores 4. The carcass 2 further comprises sidewalls 5, a profiled tire tread 6 and belt-type reinforcements 7 for the tire tread 6.

The carcass 2 is formed by two carcass layer sections 8, 9 which extend from the bead 3 into the shoulder portion 13, and the carcass layer section 10 which extends between the two shoulder portions 13. The overlap areas are designated by reference numerals 11, 12. The width B of the overlap area is selected such that essentially a stepped area is provided. The edges 14 of the two reinforcement layers 7a, 7b which are of different width overlap radially outwardly the carcass overlap area.

Figure 4:
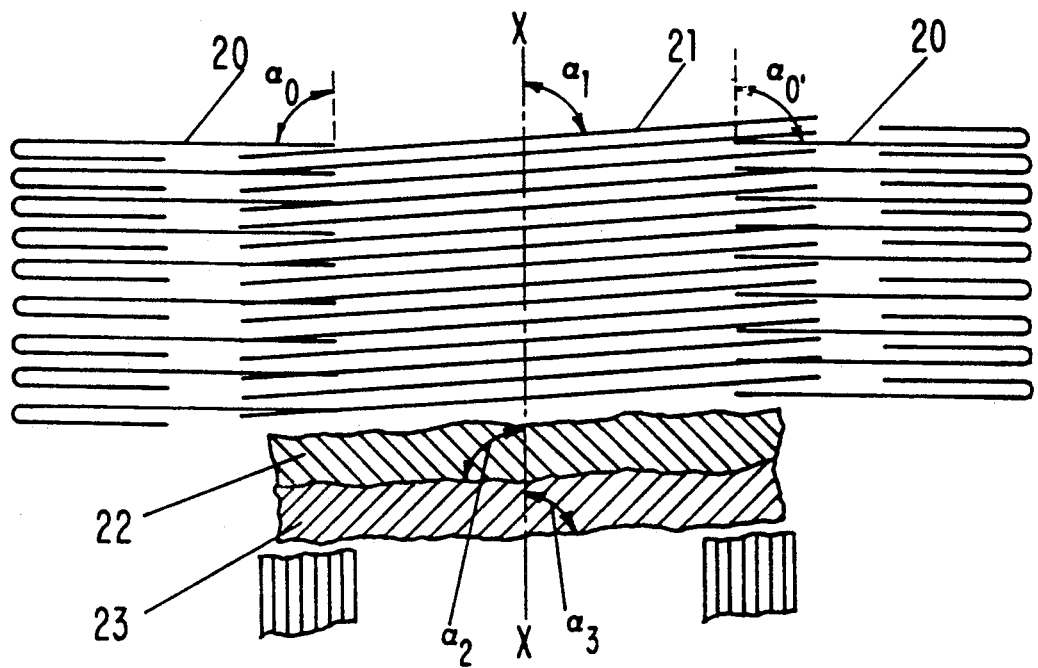
FIG. 4 is a plan view of the carcass layer sections of a carcass according to FIG. 1 with layers partially removed to show the underlying layers.

The carcass layer sections 8, 9 are provided with reinforcement elements 20 that extend in a radial direction, i.e., at an angle of 90° relative to the axis X—X (compare FIG. 4). The carcass layer section 10 is provided with reinforcement elements 21 that are disposed at an angle of $\alpha_1 := 85°$ relative to the axis x—x. At the overlap areas 11, 12 the carcass layer sections 8 and 10 as well as 9 and 10 are therefore arranged in a slightly crossed manner.

The angle $\alpha_2$ of the reinforcement elements 22 of the radially inwardly disposed belt layer 7a is approximately $-22°$ relative to the axis x—x and the $\alpha_3$ of the reinforcement element 23 of the radially outwardly disposed belt layer 7b is approximately $+22°$ relative to the axis x—x. Thus, the belt layers are arranged in a crossed manner and form a reinforcing belt layer unit for the center section. The edges of the belt layers are arranged such that a certain but selectable further gradual stepping of the stiffness of the reinforcement elements within the overlap areas is possible.

The carcass layer sections 8, 9 are provided, for example, with reinforcement elements made from a polyester cord of the type 1100/3. The carcass layer section 10 is, for example, provided with reinforcement elements made from rayon cord 1840/3.

The belt layers 7a, 7b comprise reinforcement elements of an elastic steel fabric or steel cord of the type 2+2 or 1+4. The overlap area of the carcass layer sections represents a constructive discontinuity of the finished pneumatic vehicle tire. The edges of the overlap areas may be provided at the edges of the belt layers by certain bands, that are selectable according to material and dimensions, and which are preferably made of rubber or rubber mixtures having a thickness of a few tenth of a millimeter.

These tire areas may be constructed such, by selectively choosing certain materials, dimensions and gradations, that a harmonically gradually stepped transition zone is achieved between the more flexible tire sidewalls and the belt-reinforced center section, so that the force fluctuations may be influenced by the selected arrangement and embodiment of the carcass layer sections.

Via the selected arrangement and embodiment of the overlap areas the oscillation behavior especially of the carcass body, may be influenced. With respect to the tire uniformness and the noise emission the divided carcass with its overlap areas is a well suited measure for directly influencing the force fluctuations in this area, whereby the uniformness of the manufactured vulcanized tire should be as good as possible and the noise emission as low as possible.

The pneumatic vehicle tire according to FIG. 4 shows a plan view of the essential components of the carcass and the belt with layers partially removed to show underlying layers. The reinforcement elements 20 of the carcass layer sections 8, 9 are radially disposed, that is the angle $\alpha_0$ is 90° and the angle $\alpha_0$ is 90° relative to the axis X—X.

The reinforcement elements 21 of the carcass layer section 10 are arranged at an angle $\alpha=87°$ relative to the axis x—x. The reinforcement elements 22 of the radially inwardly disposed belt layer 7a is arranged at an angle $\alpha_2=-22°$ and the reinforcement elements 23 of the radially outwardly disposed belt layer 7b is arranged at an angle $\alpha_3=+22°$ relative to the axis x—x. Thus, the reinforcement elements 23 are oppositely directed with respect to the reinforcement elements 22. The belt layer 7b is approximately as wide as the tread portion. The belt layer 7a, on the other hand, is narrower than the belt layer 7b. The edges of the belt layers 7a, 7b are stepped within the shoulder portion and overlap the overlap area with a pre-determined selectable width.

Figure 2:
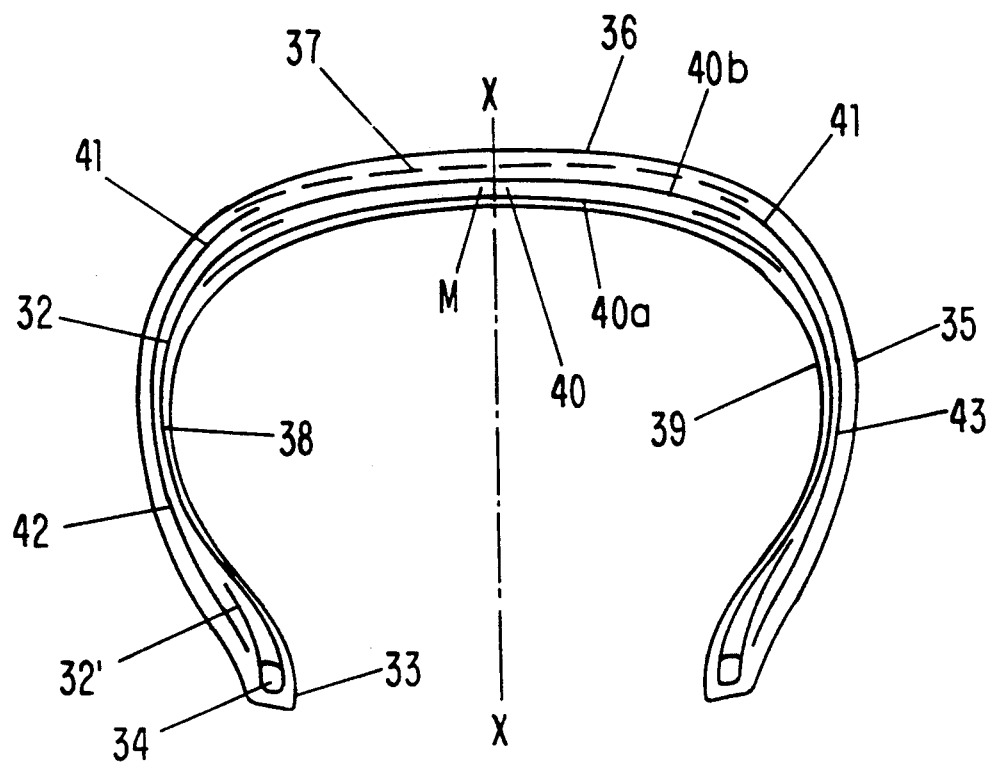
FIG. 2 shows a cross-sectional view of a pneumatic vehicle tire having a carcass made from doubled carcass layer sections.

The pneumatic vehicle tire 31 according to FIG. 2 comprises essentially a divided carcass 32, the tire beads 33 with respective bead cores 34, the sidewalls 35 and the tire tread 36 as well as belt-type reinforcements 37 between the carcass 32 and the tire tread 36.

The carcass 32 is formed by the inner carcass layer sections 38, 39, the looped-around ends 32' of which are anchored at the bead cores 34. The carcass layer sections 38, 39 extend from the bead cores 34 to the overlap area 41. A further carcass layer section 40 is arranged at the tire center portion M. The inner layer 40a and the outer layer 40b of the carcass layer section 40 overlap the carcass layer sections 38, 39.

Outer carcass layer sections 42, 43 extend from the bead area into the shoulder portion and end in the overlap area 41 radially outwardly from the carcass layer sections 38, 39. These further carcass layer sections 42, 43 stabilize the carcass, especially within the sidewalls, and may be considered auxiliary layer portions.

The carcass layer sections 42 may comprise different cords, different materials, different cord constructions and different packing densities. They may also be employed in multiple layers.

Figure 3:
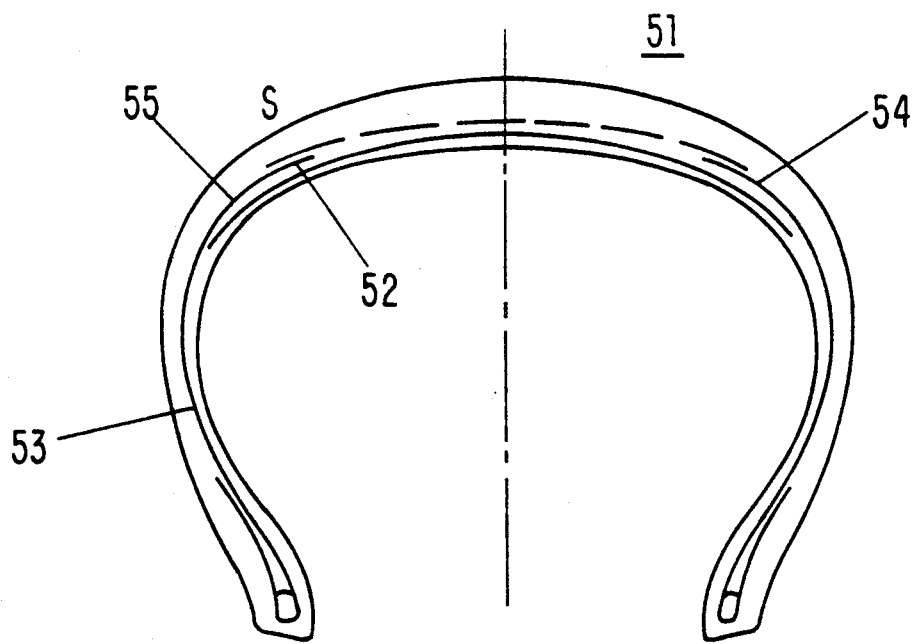
FIG. 3 is a cross-sectional view of a pneumatic vehicle tire having an asymmetric carcass comprised of carcass layer sections.

The pneumatic vehicle tire 51 according to FIG. 3 comprises an asymmetrically shaped divided carcass 52 and the aforementioned tire components such as beads, sidewalls, tire tread and belt-type reinforcements between the carcass and the tire tread.

The divided carcass 52 is formed by a shorter carcass layer section 53 the looped-around end of which is anchored to the respective bead. The carcass layer section 53 extends from the bead into the overlap area 55 within the shoulder portion S where it overlaps with the longer carcass layer section 54 that, with its looped-around portion is anchored at the respective bead and extends over the shoulder and the center portion of the tire into the overlap area 55. Both carcass layer sections 53 and 54 may be comprised of the same or different materials, the same or different cord constructions and/or the same or different packing densities, whereby the angle of orientation of the reinforcement elements of the carcass layer sections 53 and 54 are different, for example, the carcass layer section 54 is arranged radially while the carcass layer section 53 is arranged diagonally at an angle $\alpha=88°$. The asymmetric carcass, of course, is not limited to the aforementioned embodiment. A plurality of overlap areas of a plurality of carcass layer sections may be provided so that more than one overlap area will result.

Figure 5:
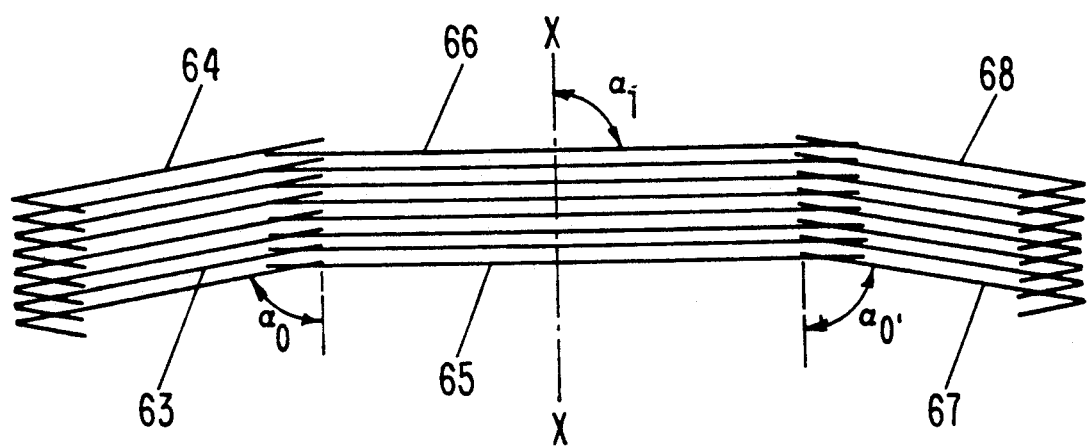
FIG. 5 is a plan view of a further embodiment of a carcass with carcass layer sections.

FIG. 5 shows a further arrangement of the reinforcement elements of the carcass layer sections. The reinforcement elements 63 of a first carcass layer section 64 are diagonally arranged and the angle $\alpha_0$ is $-87°$ relative to the axis x—x. The reinforcement element 65 of a second carcass layer section 66 in the center of the tire are arranged radially with an angle $\alpha_1=90°$ relative to the axis x—x. The reinforcement elements of the third carcass layer section 68 are arranged diagonally with an angle $\alpha_1=87°$. In a further embodiment the reinforcement elements 63 may be arranged diagonally at an angle $\alpha_0$ of a positive value and the reinforcement elements 67 may be arranged diagonally at an angle $\alpha_0$, of a negative value.

The present invention is, of course, in no way restricted to the specific disclosure of the specification and drawings, but also encompasses any modifications within the scope of the appended claims.

What I claim is:

1. In a pneumatic vehicle tire comprising a divided carcass with at least two carcass layer sections, tire beads with pull-resistant bead cores, sidewalls, a tire tread and a belt-type reinforcement between the carcass and the tire tread, whereby respective looped-around ends of a first and a second of said carcass layer sections are anchored at respective ones of said bead cores and respective further ends of said first and second carcass layer sections are disposed within respective overlap areas with adjacent ones of said carcass layer sections, wherein the improvement comprises:

reinforcement elements of at least one of said carcass layer sections have a different orientation than further reinforcement elements of further ones of said carcass layer sections, with at least one orientation being radially disposed at an angle of 90° relative to the equatorial plane of said vehicle tire and at least one further orientation being disposed at an angle of between 85° and 88° relative to the equatorial plane of said vehicle tire; and with said overlap areas, located between a respective center of said side walls and a respective shoulder portion of said tire tread, representing a stepped stiffness transition area.

2. A pneumatic vehicle tire according to claim 1, wherein said carcass layer sections are made from the same material.

3. A pneumatic vehicle tire according to claim 1, wherein said carcass layer sections are made from different materials.

4. A pneumatic vehicle tire according to claim 1, wherein said reinforcement elements are made from the same material.

5. A pneumatic vehicle tire according to claim 1, wherein said reinforcement elements of at least one of said carcass layer sections are made from material different from the material of said further reinforcement elements of further ones of said carcass layer sections.

6. A pneumatic vehicle tire according to claim 1, wherein said reinforcement elements of said carcass layer sections have the said cord construction.

7. A pneumatic vehicle tire according to claim 1, wherein said reinforcement elements of at least one of said carcass layer sections have a cord construction different from the cord constructions of said further reinforcement elements of further ones of said carcass layer sections.

8. A pneumatic vehicle tire according to claim 1, wherein said reinforcement elements of said carcass layer sections have the same packing density.

9. A pneumatic vehicle tire according to claim 1, wherein said reinforcement elements of at least one of said carcass layer sections have a packing density different from the packing density of said further reinforcement elements of further ones of said carcass layer sections.

10. A pneumatic vehicle tire according to claim 1, wherein there are more than one of said at least one further orientation and the angles of said further orientations are identical.

11. A pneumatic vehicle tire according to claim 1, wherein there are more than one of said at least one further orientation and said angle of at least one of said further orientations is different from said angle of another one of said further orientations.

12. A pneumatic vehicle tire according to claim 1, wherein said carcass comprises said first and second carcass layer sections with said looped-around ends, with said first and second carcass layer sections extending from said bead cores to said shoulder portions, and a third one of said carcass layer sections bridging a center portion of said vehicle tire between said two shoulder portions.

13. A pneumatic vehicle tire according to claim 12, wherein said first and second carcass layer sections are provided with respective auxiliary carcass layer sections that are disposed axially outwardly from said respective first and second carcass layer sections and extend from said bead cores to said shoulder portions.

14. A pneumatic vehicle tire according to claim 12, wherein said third carcass layer section bridging said center portion comprises differently formed layers.

15. A pneumatic vehicle tire according to claim 14, wherein said layers have different widths.

16. A pneumatic vehicle tire according to claim 1, wherein said carcass layer sections are arranged in an asymmetric manner.

* * * * *